United States Patent
Hooli et al.

(10) Patent No.: US 9,420,582 B2
(45) Date of Patent: Aug. 16, 2016

(54) CONFIGURATION OF RANDOM ACCESS PREAMBLE

(75) Inventors: Kari Juhani Hooli, Oulu (FI); Esa Tapani Tiirola, Kempele (FI); Kari Pekka Pajukoski, Oulu (FI); Juha Korhonen, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 281 days.

(21) Appl. No.: 14/006,708

(22) PCT Filed: Mar. 25, 2011

(86) PCT No.: PCT/EP2011/054584
§ 371 (c)(1),
(2), (4) Date: Sep. 23, 2013

(87) PCT Pub. No.: WO2012/130270
PCT Pub. Date: Oct. 4, 2012

(65) Prior Publication Data
US 2014/0010214 A1    Jan. 9, 2014

(51) Int. Cl.
H04J 3/00      (2006.01)
H04W 72/04     (2009.01)
H04J 13/00     (2011.01)
H04J 13/14     (2011.01)

(52) U.S. Cl.
CPC ....... H04W 72/0446 (2013.01); H04J 13/0062 (2013.01); H04J 13/14 (2013.01)

(58) Field of Classification Search
CPC .. H04W 72/0446; H04J 13/0062; H04J 13/14
USPC ........................................................ 370/336
See application file for complete search history.

(56) References Cited

U.S. PATENT DOCUMENTS

| 2006/0050799 | A1  | 3/2006  | Hou et al. |
| 2007/0291719 | A1* | 12/2007 | Demirhan et al. ............ 370/338 |
| 2010/0220664 | A1* | 9/2010  | Hooli et al. .................... 370/329 |

FOREIGN PATENT DOCUMENTS

| CN | 1337098 A       | 2/2002 |
| CN | 1758639 A       | 4/2006 |
| CN | 101601221 A     | 12/2009 |
| WO | WO 2008/081311 A2  | 7/2008 |
| WO | WO 2008081311 A2 * | 7/2008 |

OTHER PUBLICATIONS

Jose Ramon Gallego, Performance evaluation of nonsynchronized initial random access for mobile broadband systems, Published online: Sep. 4, 2009, Springer Science+Business Media. LLC 2009, Telecommun Sys (2010) 43: 479-294, DOI 10.1007/s 11235-009-9202-9, p. 284.*

Gallego, J.R., et al., "Performance evaluation of nonsynchronized initial random access for mobile broadband systems", © Springer Science+Business Media, LLC 2009, 16 pgs.

Bertrand, P., et al., "Chapter 19: Random Access", LTE—The UMTS Long term Evolution, , © 2009 John Wiley & Sons, Ltd., 37 pgs.

* cited by examiner

*Primary Examiner* — Huy D Vu
*Assistant Examiner* — Nizam Ahmed
(74) *Attorney, Agent, or Firm* — Harrington & Smith (57) ABSTRACT

There is provided a method, an apparatus and a computer program product for selecting at least one extended preamble. The selected extended preamble fulfills certain criteria regarding the cyclic shift-specific timing uncertainty windows and supports for high speeds and high frequencies.

20 Claims, 3 Drawing Sheets

CONFIGURATION OF RANDOM ACCESS PREAMBLE

FIELD

The invention relates generally to mobile communication networks. More particularly, the invention relates to transmitting a random access request on a physical random access channel (PRACH) and, in particular, to the configuration of the PRACH preamble of the request when user terminals moving in high speed.

BACKGROUND

In radio communication networks, such as the Long Term Evolution (LTE) or the LTE-Advanced (LTE-A) of the 3$^{rd}$ Generation Partnership Project (3GPP), physical random access channel (PRACH) may be used by a user equipment (UE) to request random access to the network. PRACH carries a random access preamble, which is typically generated by using a constant amplitude zero autocorrelation (CAZAC) waveforms. Zadoff-Chu (ZC) sequences are well known CAZAC sequences. The main benefit of using a CAZAC, or a ZC, sequences is that their out-of-phase periodic (cyclic) autocorrelation is equal to zero. This makes it easier to detect the signals at the receiver, such as at a base station or at an enhanced node B (eNB), for example.

However, several problems are related to the detection of the preamble when UEs with high speeds are present. This may be the case when the transmitting UE is located in a high speed train. Compensation methods based on frequency offset estimation cannot be applied due to lack of prior frequency offset estimate. Thus, it is important to provide a solution for reliably configuring the PRACH so that the detection of the preamble at the receiver is also reliable.

BRIEF DESCRIPTION OF THE INVENTION

Embodiments of the invention seek to improve the reliability of preamble detection.

According to an aspect of the invention, there is provided a method as specified in claim 1.

According to an aspect of the invention, there are provided apparatuses as specified in claims 16 and 33.

According to an aspect of the invention, there is provided a computer program product as specified in claim 34.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the 3$^{rd}$ Generation Partnership Project (3GPP), are typically composed of at least one base station (also called a base transceiver station, a Node B, or an evolved or enhanced Node B, for example), a user equipment (also called a user terminal and a mobile station, for example) and optional network elements that provide the interconnection towards the core network. The base station connects the UEs via the so-called radio interface to the network.

Figures 1, 2:
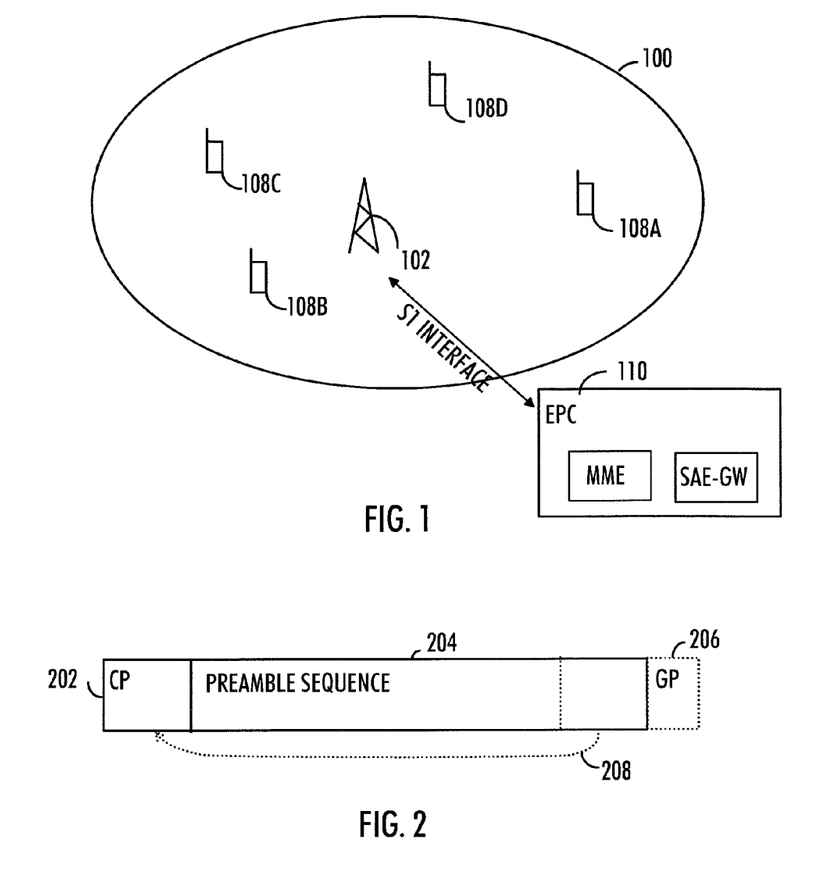
FIG. 1 presents an exemplary radio network.
FIG. 2 shows an exemplary format of a PRACH preamble.

FIG. 1 shows a communication network, according to an embodiment. As explained, the communication network may comprise a base station 102. The base station 102 may provide radio coverage to a cell 100, control radio resource allocation, perform data and control signaling, etc. The cell 100 may be a macrocell, a microcell, or any other type of cell where radio coverage is present. Further, the cell 100 may be of any size or form, depending on the antenna system utilized.

In general, a base station 102 applicable to the embodiments may be configured to provide communication services according to at least one of the following communication protocols: Worldwide Interoperability for Microwave Access (WiMAX), Universal Mobile Telecommunication System (UMTS) based on basic wideband-code division multiple access (W-CDMA), high-speed packet access (HSPA), LTE, and/or LTE-A. The base station 102 may additionally provide the second generation cellular services based on GSM (Global System for Mobile communications) and/or GPRS (General Packet Radio Service). The present embodiments are not, however, limited to these protocols. The LTE is specified in specifications from the past and current Releases, such as in Releases 8 to 10. Currently, research is being made for the release 11.

The base station 102 may be used in order to provide radio coverage to the cell 100. The base station 102 may be seen as one communication point of the network. The base station 102 may be node B, evolved node B (eNB) as in LTE-A, a radio network controller (RNC), or any other apparatus capable of controlling radio communication and managing radio resources within the cell 100. The base station 102 may also have an effect on mobility management by controlling and analyzing radio signal level measurements performed by a user terminal, carrying out its own measurements and performing handover based on the measurements.

For the sake of simplicity of the description, let us assume that the base station is an eNB. The development of the evolved universal mobile telecommunication's system (UMTS) terrestrial radio access network (E-UTRAN), which is the air interface of the LTE, is concentrated on the eNB 102. All radio functionality is terminated here so that the eNB 102 is the terminating point for all radio related protocols. The E-UTRAN may be configured such that orthogonal frequency division multiple access (OFDMA) is applied in downlink transmission, whereas single carrier frequency division multiple access (SC-FDMA) may be applied in uplink, for example. In the case of multiple eNBs in the communication network, the eNBs may be connected to each other with an X2 interface as specified in the LTE.

The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forward-ing, E-UTRAN idle mode packet buffering, etc. The user plane bypasses the MME plane directly to the SAE-GW. The SAE-GW may comprise two separate gateways: a serving gateway (S-GW) and a packet data network gateway (P-GW). The MME controls the tunneling between the eNB and the S-GW, which serves as a local anchor point for the mobility between different eNBs, for ex-ample. The S-GW may relay the data between the eNB and the P-GW, or buffer data packets if needed so as to release them after appropriate tunneling has been established to a corresponding eNB. Further, the MMEs and the SAE-GWs may be pooled so that a set of MMEs and SAE-GWs may be as-signed to serve a set of eNBs. This means that an eNB may be connected to multiple MMEs and SAE-GWs, although each user terminal is served by one MME and/or S-GW at a time.

According to an embodiment, the eNB 102 may establish a connection with a user equipment (UE) 108A to 108D such as a mobile user terminal, a palm computer, or any other apparatus capable of operating in a mobile communication network. That is, the UE 108A to 108D may perform data communication with the eNB 102.

Every now and then the UE requires access to the network via random access. This random access procedure may be initiated by transmission of a random access request from the UE 302 to an eNB 300 on a physical random access channel (PRACH) 304, as is the case in FIG. 3A. In one possible scenario the random access may be used for the purposes of handovers (HO) or eNB initiated timing advance recovery. In such scenarios, the UE may apply contention free random access. If successfully detected at the eNB 300, a random access response may be received from the eNB 300 via a communication link 306.

Figure 3A:
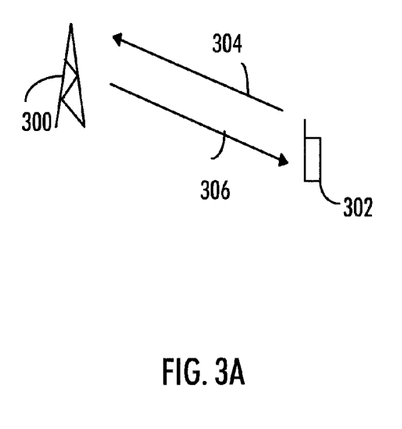
FIG. 3A shows a communication scenario according to an embodiment.
Figure 3B:
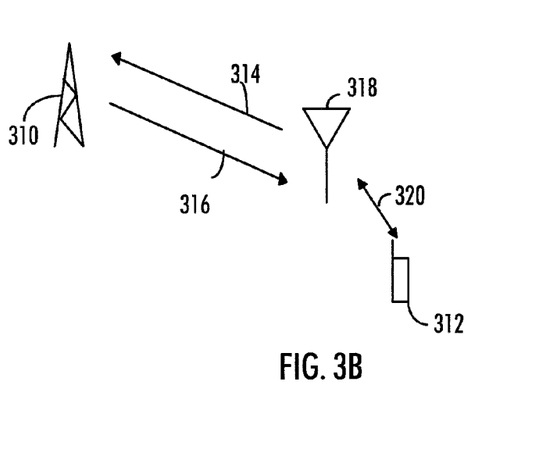
FIG. 3B shows another communication scenario according to an embodiment.

In another scenario depicted in FIG. 3B, a UE 312 may be communicating with an eNB 310 via a relay node 318. In this case a communication link 320 between the UE 312 and the relay node 318, and further communication links 314 and 316 between the eNB 310 and the relay node 318 (backhaul link) may be used for communication. In this scenario, the random access request to the eNB 310 may be transmitted from the relay node 318 via the link 314 to the eNB 310, and, if successful, a response is obtained at the relay node 318 via the link 316. This may be the case for example when UEs 312 are connected to mobile relay 318 in train, and the relay node 318 performs a handoff to a next eNB along the track.

FIG. 2 illustrates the structure of the random access request. It may consist of cyclic prefix (CP) 202, a preamble sequence 204 and a guard period 206, which is basically an unused portion of time starting from the end of the sequence 204. The guard period 206 allows for timing uncertainty at the receiver (eNB) which results from the distance between the UE and the eNB. The cyclic prefix 202 may be a repetition of the end of the sequence with a certain length, as shown by reference numeral 208 in FIG. 2.

The sequence 204 is typically a Zadoff-Chu sequence, which, when applied to radio signals, gives rise to an electromagnetic signal of constant amplitude, whereby cyclically shifted versions of the sequence comprising the signal do not cross-correlate with each other when the signal is recovered at the receiver. A generated Zadoff-Chu sequence that has not been shifted (zero shift) is known as a root sequence.

In the LTE release 8, the PRACH applies a narrower subcarrier spacing than normal uplink transmission, specifically 1250 Hz for PRACH formats 0-3 and 7500 Hz for PRACH format 4. The ratio of the normal uplink subcarrier spacing to PRACH subcarrier spacing is thus 12 for Formats 0-3 and two for Format 4. Nevertheless, the PRACH is designed to fit in the same bandwidth as six physical resource blocks (PRB) of normal uplink transmission, that is in the same bandwidth as 72 subcarriers at 15000 Hz spacing. Therefore, certain number of subcarriers for the PRACH, specifically 864 for PRACH formats 0-3 and 144 for PRACH format 4, are specified for PRACH. However, not all are active subcarriers. In fact, PRACH format 0-3 uses 839 active subcarriers, and PRACH format 4 uses 139 active sub-carriers.

For the sake of simplicity, let us consider the PRACH format 0. Accordingly, the length of the ZC sequence $N_G$ is 839. In the LTE release 8, there are 64 preambles of ZC sequences available in each cell. The 64 sequences may be found by obtaining information on the root sequence, which may be broadcasted in the cell. Then eNB and UE may use the root sequence and, in particular, the different cyclic shifts of the root sequence to find the 64 preambles. If all 64 sequences cannot be found from one root sequence, the UE and eNB find the remaining preambles from root sequences having consecutive logical indexes u. Therefore, the preambles in the set of 64 preambles can be different Zadoff-Chu root sequences or different cyclic shifts from one Zadoff-Chu root sequence or both.

Figure 4:
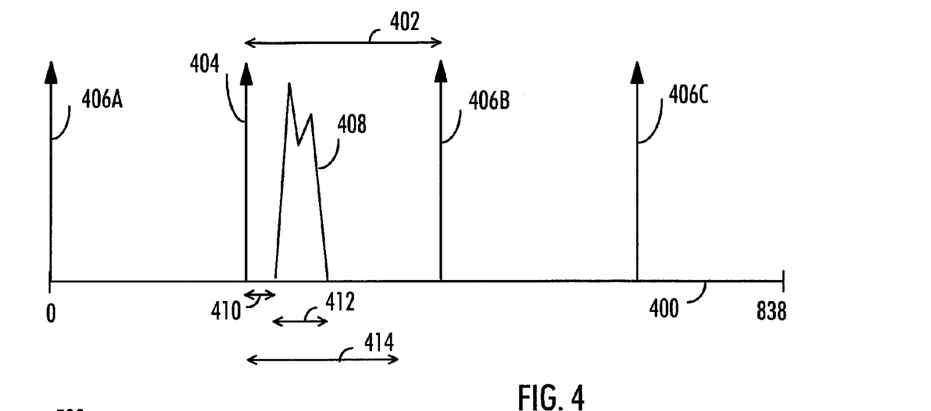
FIG. 4 illustrates delays related to the detection of the preamble.

In an addition, when different cyclic shifts of one root ZC sequence are used as preambles, a sufficient number of cyclic shifts are left unused between the cyclic shifts used as preambles as illustrated in FIG. 4 with reference numeral 402. In this embodiment, the length of the ZC sequence, $N_G$=839, is illustrated on axis 400. The cyclic shift separation of $N_{CS}-1$ cyclic shifts between the available preambles for the cell is done to allow for a sufficient window for propagation delay 410 in the uplink (UL) as well as in the downlink (DL) and to allow for appropriate timing estimation.

FIG. 4 illustrates a correlation between the transmitted preamble and different cyclic shifts of the corresponding root sequence. As an example, from FIG. 4 it can be seen that a preamble 404 among the available preambles 404, 406A, 406B, and 406C is transmitted from the UE to the eNB. The length of the transmitted preamble sequence 404 is the above mentioned 839. However, the receiver (eNB) receives the transmitted preamble 404 at a later time due to propagation delay 410. That is, the received preamble 408 may be seen as a preamble generated by another, unavailable, cyclic shift. Moreover, owing to multipath propagation the received preamble 408 is spread as shown with delay spread 412. Because of the propagation delay 410 and the delay spread 412, it is beneficial to have the $N_{CS}-1$ unused cyclic shifts between the available cyclic shifts. This way, the receiver may use, at maximum, the whole $N_{CS}$ size window to detect the received preamble. The window 414 over which the eNB may try to detect the transmitted preamble is denoted as timing uncertainty window and it is related to the cell range and has its maximum value limited by the $N_{CS}$.

However, problems may occur when the UEs are travelling with high speed, such as 500 km/h. This may be the case in high speed trains, for example, where typically a line of sight (LoS) signal exists and the signal suffers from high Doppler shift. Accordingly, LTE mobile relays including also considerations for high speed trains is a candidate study item for LTE Release 11. In particular, it has been identified that uplink physical random access channel (PRACH) preamble is sensitive to frequency offsets, that is to Doppler frequency offset, when Zadoff-Chu sequences are used as the preamble sequences. In essence, a frequency offset may transform the transmitted preamble sequence 404 of FIG. 4 into different cyclic shifts of that sequence. This may decrease the signal energy detected through correlation with the transmitted preamble at the receiver, increase the false alarm rate (detection of a preamble that was not transmitted at all), and cause errors in the timing estimation.

Generally two types of connections can be considered in the context of high speed trains. In the first type, the UEs are in the possession of passengers and located in the railway carriage. The UEs in this case may be connected directly to eNB as shown in FIG. 3A. In the second type, communication equipment installed on the carriage provides communication services to the passengers via wireless local area network (WLAN) or a relay link (as in FIG. 3B). In this case, LTE air interface with high Doppler shift is used to the eNB for backhaul purposes only.

The Doppler shift $f_D$ may be defined by $-v_{s,r}/\lambda$, wherein $v_{s,r}$ is the velocity of the source relative to the receiver. $v_{s,r}$ is positive when the source and the receiver are moving away from each other and negative when the source and the receiver are moving towards each other. $\lambda$ is the wavelength of the transmitted signal and depends on the carrier frequency $f_o$. For certain preamble sequences, the frequency offset caused by the Doppler shift $f_D$, when positive, may transform the transmitted preamble sequence into a particular cyclic shift of that ZC root sequence and a negative frequency offset, caused by the Doppler shift $f_D$, may transform the transmitted preamble sequence into another particular cyclic shift. In an embodiment, these particular sequences are obtained by taking a discrete Fourier transform (DFT) from the preamble sequence, cyclically shifting +1 or −1 the obtained frequency domain presentation of the sequence, and taking inverse DFT (IDFT) from the obtained frequency domain cyclic shifts. Equivalently, the particular sequences may be obtained by applying cyclic shift of $+/-c_{off}$ to the preamble sequence. The $c_{off}$ is referred to as cyclic shift offset and is given by $c_{off} = (N_G m-1)/u$, where m is smallest positive integer for which $c_{off}$ is integer, u is Zadoff-Chu root sequence index and $N_G$ is the sequence length ($N_G$=389 for PRACH format 0-3). Thus, the cyclic shift of $+/-c_{off}$ may be named frequency cyclic shift of +/−1.

In a high speed mode, where the above obtained particular high speed mode preamble sequences are used and the above explained Doppler shift induced cyclic shifts are taken into account, speeds of up to 350 km/h can be supported with up to 2 GHz carrier frequencies. As the transmitted preamble suffers from a cyclic shift due to Doppler, when the receiver performs PRACH preamble detection, the optimal receiver matches the timing uncertainty window to the shifted preamble and, thus, performs detection by using all three cyclic shifts (the cyclic shift $\Delta CS_0$ due to the propagation delay, and the frequency cyclic shifts of +1 and −1 of the original cyclic shift $\Delta CS_0$) and the corresponding timing uncertainty windows.

In order to support speeds up to 500 km/h with carrier frequencies up to 3 GHz, the above is not sufficient. Nevertheless, high carrier frequencies, such as 3 GHz, are considered for UE-eNB direct communication and also especially for the backhauling purposes. This is because the handover signaling load does not significantly increase with shrinking cell sizes as the number of high speed connections is small.

Therefore, in an embodiment, at least one extended preamble from cyclically shifted sequences of the Zadoff-Chu root sequence is selected, wherein the selected at least one extended preamble is to be used in the uplink random access request and each selected extended preamble is the result of a selected cyclic shift which corresponds to cyclic shift-specific timing uncertainty windows, each having a predefined length. The cyclic shift-specific timing uncertainty windows of each extended preamble comprise at least a first window including at least the selected cyclic shift, a second window and a third window corresponding to frequency cyclic shifts of +1 or −1 of the first window, respectively, and a fourth window and a fifth window corresponding to frequency cyclic shifts of +2 or −2 of the first window, respectively. Frequency cyclic shift of +/−2 is equal to $+/-2c_{off}$. Further criteria may be that any of the above mentioned cyclic shift-specific timing uncertainty windows of the selected extended preamble do not overlap with one other or with any timing uncertainty window of any other preamble using the same Zadoff-Chu root sequence.

The other preamble may be an extended preamble or non-extended preamble that may be selected and used in a random access request. The non-extended preamble represents a preamble which does not fulfill all the above criteria related to the timing uncertainty windows. Thus, the selection of the non-extended preamble is more liberal. For example, in the selection of the non-extended preamble, at least the fourth window and the fifth window may not be comprised in the timing uncertainty windows. Examples of non-extended preambles include normal preambles and high speed preambles from the release 8 of the LTE. The extended preamble may also be called an extended high speed preamble or special-purpose preamble to differentiate from the normal preambles or from normal high speed preambles of the Release 8 of the LTE.

It should be noted that the timing uncertainty windows of other preambles that are considered in the selection of extended preamble in order to avoid overlap may comprise all five timing uncertainty windows (thus, the other preamble is an extended preamble). Alternatively, it may comprise only the first window, or the first, the second and the third timing uncertainty windows (thus, the other preamble is a non-extended preamble). This can be the case for example when the extended preamble is used between the relay node and the eNB to support backhauling and the use of other preambles is prevented from high-speed trains with speed above a predetermined limit, such as 360 km/h.

Figure 5:
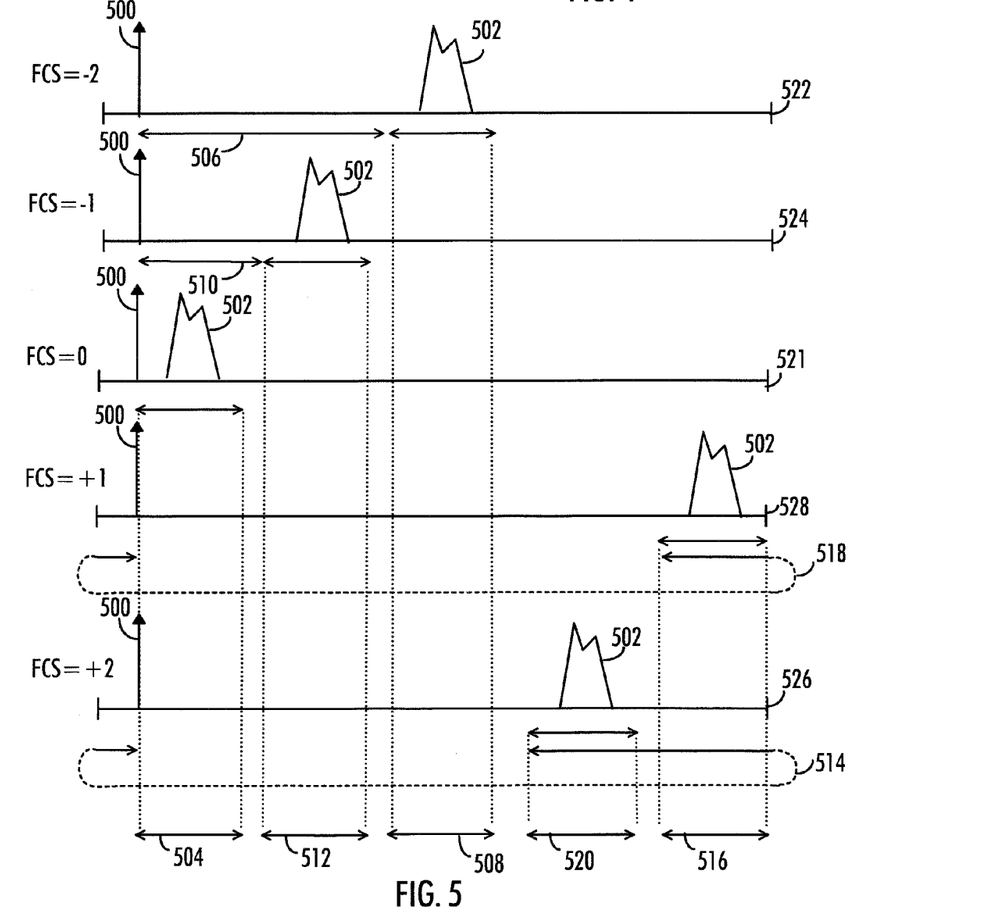
FIG. 5 illustrates timing uncertainty windows related to an extended preamble according to an embodiment.

Even though 64 preambles are typically used, the selection of extended preambles may comprise the selection of any number of extended preambles, not necessarily 64. The avoidance of the overlap of the timing uncertainty windows is shown in FIG. 5. FIG. 5 illustrates correlations between the transmitted preamble and different cyclic shifts of the corresponding root sequence. Let us assume that the transmitted preamble 500 suffers from a propagation delay that causes the received preamble 502 to be cyclically shifted from the transmitted one, as explained and shown in FIG. 4. This applies even when the frequency cyclic shift (FCS), which is applied to mitigate the high Doppler $f_D$, is zero as shown on axis 521.

In the detection at the receiver, a timing uncertainty window 504 is applied. With the FCS of −2, as shown on axis 522, the high Doppler shift transforms the transmitted preamble 500 into another cyclic shift of the same ZC root sequence. This change is depicted with reference numeral 506. As a consequence, the receiver needs to perform detection also for the timing uncertainty window 508. With the FCS of −1, as shown on axis 524, the experienced Doppler shift transforms the transmitted preamble 500 into another cyclic shift of the same ZC root sequence. This change is depicted with reference numeral 510. As a consequence, the receiver needs to perform detection also for the timing uncertainty window 512. With the FCS of +2, as shown on axis 526, the high Doppler shift transforms the transmitted preamble 500 into another cyclic shift of the same ZC root sequence. This change is depicted with reference numeral 514. As a consequence, the receiver needs to perform detection also for the timing uncertainty window 516. With the FCS of +1, as shown on axis 528 the experienced Doppler shift transforms the transmitted preamble 500 into another cyclic shift of the same ZC root sequence. This change is depicted with reference numeral 518. As a consequence, the receiver needs to perform detection also for the timing uncertainty window 520.

In the example of FIG. 5, the timing uncertainty window 504 can be seen as the first window, the timing uncertainty window 516 can be seen as the second window, the timing uncertainty window 512 can be seen as the third window, the timing uncertainty window 520 can be seen as the fourth window, and the timing uncertainty window 508 can be seen as the fifth window. As shown, the first window comprises the selected cyclic shift corresponding to the selected extended preamble 500, which is then transmitted. In an embodiment, the first window starts from the cyclic shift corresponding to the transmitted extended preamble 500. The timing uncertainty window 504 (=first window) has sufficient length to cover the expected cyclic shift due to propagation delay.

The window elements (=cyclic shifts) comprised in the second timing uncertainty window are frequency cyclic shifts of +1 of the elements (=cyclic shifts) comprised in the first window. Therefore, the second window is frequency cyclic shift of +1 of the first window. The third, fourth, and fifth window are generated in the same manner.

From FIG. 5 it is also clear that the preamble 500 can be selected as the extended preamble as none of the five windows 504, 508, 512, 516 and 520 are overlapping. It is also assumed that none of these windows overlap with any timing uncertainty window of any other preamble using the same Zadoff-Chu root sequence. As said, it is only these particular extended preambles that may be considered for the high carrier frequency, high Doppler scenarios. The non-extended preambles do not provide sufficient reliability in the detection of the preambles.

In an embodiment, in order to allow for the propagation delay related cyclic shift, the number of cyclic shifts available for use in the generation of the extended preamble is limited. In an embodiment, the length of each timing uncertainty window equals to a cyclic shift separation $N_{CS}$ between the cyclic shifts available for the selection of the extended preamble. This is for allowing sufficient timing window for the detection of the delays preamble without detecting any other preamble generated with the adjacent ZC root sequence. The separation depends on cell range, for example.

In an embodiment, the frequency cyclic shift of +1, −1, +2, or −2 of a selected cyclic shift is given by a cyclic shift offset $+c_{off}$, $-c_{off}$, $+2c_{off}$ or $-2c_{off}$, respectively, where $c_{off}=(N_Gm-1)/u$, where $N_G$ is a length of the extended preamble, u is a Zadoff-Chu root sequence index, and m is a smallest positive integer for which $c_{off}$ is an integer.

In an embodiment, it is tested whether any of the different cyclic shifts available for use in the generation of the extended preamble fulfills the requirements related to the cyclic shift-specific timing uncertainty windows or not. Then at least one of the cyclic shifts, which fulfill the above requirements, may be applied in the generation of the selected at least one extended preamble. The testing may be done in consecutive order, for example every $N_{CS}$ cyclic shift starting from the cyclic shift of 0, or according to a corresponding algebraic expression. The information that the UE or the eNB needs to from the set of extended preambles may include the root sequence index u and the cyclic shift offset $C_{off}$.

In an embodiment, the UE and the eNB may obtain knowledge that the cell is to be configured such that the extended preambles may be used by receiving information informing that at least one extended preamble is to be selected. A specific flag for this purpose may be used. Accordingly, the UE and eNB both are aware that extended preambles are available to be used and the criteria for the selection are known to both the UE and the eNB. The information may be broadcasted in the cell by a radio network controller or alike.

Figure 6A:
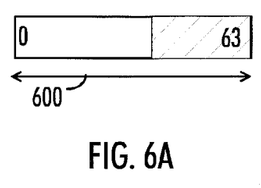
FIG. 6 shows three different embodiments for applying the extended preambles in the cell-specific set of preambles.

In an embodiment as shown in FIG. 6A, the set of cell-specific preamble sequences available for use in the uplink random access comprise only the selected at least one extended preamble. In an embodiment, there are 64 extended preambles available for use in the cell, as shown in FIG. 6A with reference numeral 600. Each preamble in the set is selected by taking into account the requirements regarding the five timing uncertainty windows, thus, each preamble is an extended preamble. This is advantageous so that the eNB need not be configured to detect also the normal or high speed preambles of the Release 11 of the LTE, for example. Also, the Release 11 UE does not need to estimate its speed and to select the preamble type accordingly. Thus, this embodiment allows for a simplified configuration of the cell and of the receiver as well as for simplified operation of the UE. The receiver does not need to worry about any non-extended preambles. If configured for the extended high speed mode, the cell is available only for the UEs capable of determining the extended preambles.

In an embodiment, the UE or the eNB selects a plurality of extended preambles and divides them into at least two sets, wherein at least one set is reserved for contention free random access and at least one other set is reserved for contention based random access. The contention-free random access preamble set may be allocated to a particular UE, for example during handover (HO). These preambles may be also called dedicated preambles. In FIG. 6, the dedicated preambles are shown with right leaning diagonal lines. The contention based random access preambles may be used during by any UE in the cell. These preambles may be called non-dedicated preambles.

Figure 6B:
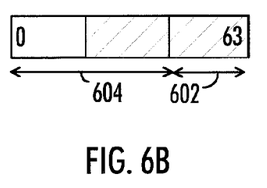

In another embodiment as shown in FIG. 6B, the set of cell-specific preamble sequences available for use in the uplink random access comprise the selected at least one extended preamble and at least one non-extended preamble. In the selection of the at least one non-extended preamble, at least the fourth window and the fifth window are not comprised in the timing uncertainty windows. Moreover, in the selection of the non-extended preambles, the second and the third windows may also be disregarded. Thus, the non-extended preamble may be any preamble: a different Zadoff-Chu sequence or a different cyclic shift from the same Zadoff-Chu root sequence. Thus, the non-extended preambles do not fulfill all of the criteria regarding the five timing uncertainty windows. The non-extended preambles can be for example normal preambles or the high speed preambles of the Release 8 of the LTE.

This embodiment is shown in FIG. 6B having 64 preambles in the set of cell-specific preambles, as an example. The extended preambles are shown with reference numeral 602 whereas the non-extended preambles are shown with reference numeral 604.

In an embodiment, a plurality of non-extended preambles 604 is selected and at least one of the selected at least one extended preamble 602 is reserved for the contention free random access (a dedicated preamble). In one embodiment, the dedicated preambles of the cell comprise only extended preambles 602, whereas in another embodiment, as shown in FIG. 6B, only part of the dedicated preambles (right leaning diagonal lines) are extended preambles 602 while the remaining dedicated preambles are non-extended preambles. In the latter embodiment, the plurality of the selected non-extended preambles 604 may be divided into at least two sets, wherein at least one set is reserved for the contention free random access (right leaning diagonal lines) and at least one other set is reserved for the contention based random access.

The benefit of the embodiment, where the extended preambles 602 cover only a part of the dedicated preambles, is that it allows for a backward compatibility with the previous releases of the LTE. As a further embodiment of this advantageous case the preamble set of, for example, 64 preambles maybe divided into four groups. The first two groups are the contention based preambles. The third group contains dedicated preambles (right leaning diagonal lines) that can be used with all UEs (non-extended preambles 604), and the fourth group is the dedicated preambles (right leaning diagonal lines) that comprise the selected extended preambles 602. The third and fourth group may share (at least partially) the same Zadoff-Chu root sequences. This is because the eNB controls the usage of dedicated preambles and may thus avoid collisions. In other words, the eNB may avoid allocating an extended preamble for an UE of a previous release of the LTE. In an embodiment, information relating to the number of the extended preambles to be selected is obtained. This information may be obtained via broadcasting in the cell or via a higher layer signaling. Alternatively, the information may be multicasted to all UEs capable of handling with the extended preambles. In other words, a RACH parameter is added to the system information for telling UEs how many preambles there are for the extended high speed mode. If the value of the parameter is N, the UE will determine 64-N first preambles with requirements relevant for the non-extended preambles (for example, by using the Release 8 definitions) and the last N preambles are obtained by taking into account the extended restrictions, thus obtaining N extended high speed preambles.

Figure 6C:
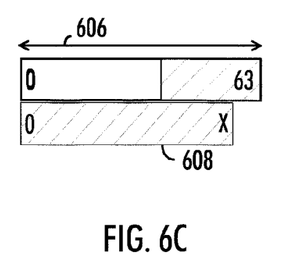

In an embodiment as shown in FIG. 6C, the cell-specific preamble sequences available for use in the uplink random access comprises two separate sets: a first set 606 comprising only at least one non-extended preamble, wherein, in the selection of the at least one non-extended preamble, at least the fourth window and the fifth window are not comprised in the timing uncertainty windows, and a second set 608 comprising only the at least one extended preamble. The non-extended preambles may be normal preambles or high speed preambles of the Release 8 of the LTE, for example. In addition to disregarding the forth and the fifth window (to obtain the high speed preambles of the LTE), the second and the third window may be disregarded as well (to obtain the normal preambles of the LTE).

In an embodiment, the size of the first set is 64 preambles, whereas the size of the second set (denoted with X) may be 64 or smaller. Thus, the cell-specific preamble sequences available for use in the uplink random access may comprise 64+X preambles. As the cell specific set contains both the extended preambles and the non-extended preambles, the system is backward compatible with the previous releases of the LTE. In other words, when a train, for example, with lower velocity passes through the cell, legacy terminals are able to find valid PRACH configuration and connect to the cell (without need to reconfigure the cell).

In an embodiment as shown in FIG. 6C, the second set 608 containing the extended preambles is reserved only for a contention free random access (dedicated preambles, shown with right leaning diagonal lines). Thus, all the extended preambles are dedicated preambles. In that case, UE aware of the second set 608 will use the first preamble set 606 for the contention based random access. However, in another embodiment, the second set may also comprise at least one extended preamble reserved for a contention free random access and at least one extended preamble reserved for a contention based random access.

According to definitions of previous releases of the LTE, the responses to preambles from the set 606, observed in the same frequency and time resource, may be collected to a single DL response message (message 2 of the random access procedure) that is addressed with an identity, such as a random access radio network temporary identifier (RA-RNTI) of an appropriate offset, for example. When the UE sends a preamble, it counts the RA-RNTI from the used frequency and time resource of the preamble and tries to find a DL assignment addressed with the RA-RNTI on a physical downlink control channel (PDCCH) inside a window that may be several subframes long. The response message, transmitted on a physical downlink shared channel (PDSCH), indicates which ones of the 64 preambles have been observed.

In an embodiment, the response message format is modified for accommodating responses for both preambles from the sets 606 and 608. Then part of the response message is accordant with the earlier releases but in addition there may be a space for responses to preambles from the second set 608 that UEs of the earlier releases may regard as padding. The Release 8 mapping from the resource unit of a preamble to the RA-RNTI can be used with all preambles.

Thus, in an embodiment, different mappings from a resource unit to identifiers, such as to the RA-RNTI, are defined for the first set 606 and for the second set 608 in order to separate responses for the preambles of the first 606 and of the second 608 set. One possible way is to define an offset such that RA-RNTI regions of preambles from the sets 606 and 608 never overlap. Then the Release 8 definition of message 2 can be used with all preambles.

In an embodiment, the random access request carrying a preamble sequence selected from the first set 606 is transmitted in a different resource unit (for example, in a different subframe) than the random access request carrying a preamble sequence selected from the second set 608. The Release 8 mapping from the resource unit of preamble to RA-RNTI and the Release 8 definition of message 2 can be used with all preambles. This option ensures avoidance of collisions, yet allowing the same sequences to be used for both the first 606 and the second 608 set.

In an embodiment, in order to allow transmitting the random access request carrying a preamble sequence selected from the first set 606 in a same resource unit as the random access request carrying a preamble sequence selected from the second set 608, different Zadoff-Chu root sequences may be applied for the second set 608 and for the non-extended preambles of the first set 606 which are reserved for a contention based random access.

In an embodiment, the second set 608 and dedicated preambles of first set 606 may share (at least partially) the same Zadoff-Chu sequences as eNB controls the usage of the dedicated preambles and may thus avoid collisions.

In an embodiment, the random access request carrying a preamble sequence is received. The reception may take place at the eNB, for example. Consequently, the receiver may correlate the received random access request with the expected at least one extended preamble in order to detect the received preamble sequence, wherein the correlation is performed for each window of the cyclic shift-specific timing uncertainty windows. The expected preamble may be the selected extended preamble or any preamble of the selected cell-specific set of extended preambles. In other words, in the receiver, received signal per antenna may be correlated with each ZC root sequence in the cell specific preamble set. The correlation results are typically provided for all cyclic shifts of the sequence. In order to detect the extended preamble, correlation results for all five timing uncertainty windows are utilized.

In the case where the high speed UEs are communicating with the eNB via a relay or are communicating through a WLAN in the high speed train, for example, as shown in FIG. 3B, the eNB 310 may transmit information of a selected mobile-specific extended preamble to the UE 312 or to a relay node 318. The extended preamble is used only for the backhaul link. The single preamble suitable for extended high speed random access is configured via a UE-specific (or a relay-specific) higher layer signaling. The higher layer signaling may be part of a handover command that is forwarded to the UE 312 via a source cell from a target cell, for example. The higher layer signaling may contain a parameter defining the Zadoff-Chu root sequence index and an appropriate cyclic shift. By knowing these, the receiver may generate the UE-specific preamble. The allocated preamble may then be transmitted (when random access is needed) on the PRACH resources and the corresponding message 2 (random access response) may then be assigned via a physical downlink control channel (PDCCH) with an appropriate identifier corresponding to the UE 312.

In the allocation of the UE-specific extended preamble, the eNB 310 must ensure that the timing uncertainty windows of the extended preamble do not overlap with any of the timing uncertainty windows of the cell-specific preamble set. In an embodiment, this is achieved by allocating to the UE 312 a Zadoff-Chu root sequence that is not included to the cell-specific preamble set.

When five timing uncertainty windows (instead of less timing uncertainty windows) are used for the preamble detections, this means that a smaller portion of Zadoff-Chu sequences is suitable for the generation of the extended preambles, and, thus, larger number of Zadoff-Chu sequences are needed to comprise a set of 64 preambles, for example. For this reason, in an embodiment, the extended preambles are used only as the dedicated preambles. This is suitable solution especially for the backhaul link as the dedicated preambles are mainly used in the handover and it is not likely that backhaul link is initialized at high speeds of 500 km/h.

Figure 7:
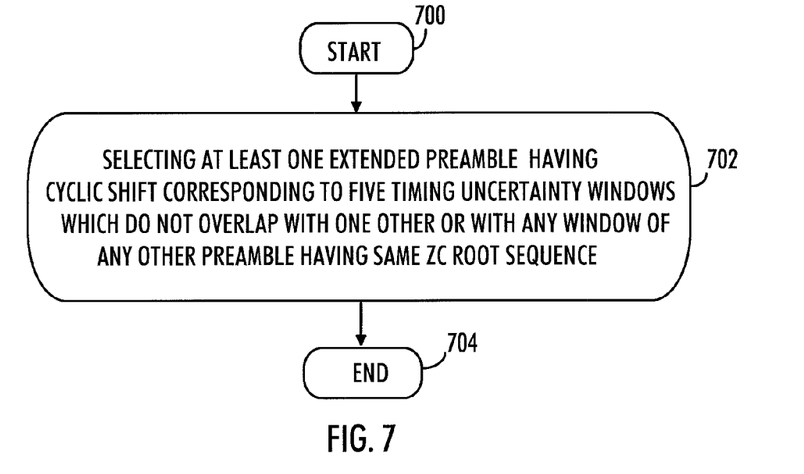
FIG. 7 shows a method for selecting the at least one extended preamble.
Figure 8:
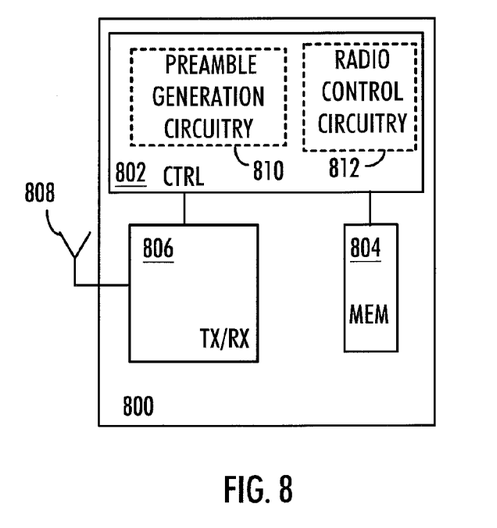
FIG. 8 presents an apparatus for selecting the at least one extended preamble.

A method for selecting at least one extended preambles is depicted in FIG. 7. The method starts in step 700. In step 702 at least one extended preamble from cyclically shifted sequences of a Zadoff-Chu root sequence is selected, wherein the selected at least one extended preamble is to be used in an uplink random access request, wherein each selected extended preamble is the result of a selected cyclic shift which corresponds to cyclic shift-specific timing uncertainty windows, each having a predefined length, wherein the cyclic shift-specific timing uncertainty windows of each extended preamble comprise at least a first window including at least the selected cyclic shift, a second and a third window corresponding to frequency cyclic shifts of +1 or −1 of the first window, respectively, and a fourth and a fifth window corresponding to frequency cyclic shifts of +2 or −2 of the first window, respectively, and any of the cyclic shift-specific timing uncertainty windows of the selected extended preamble do not overlap with one other or with any timing uncertainty window of any other preamble using the same Zadoff-Chu root sequence. The method ends in step 704. A very general architecture of an apparatus according to embodiments is shown in FIG. 8. FIG. 8 shows only the elements and functional entities required for understanding the apparatus according to the embodiments. Other components have been omitted for reasons of simplicity. The implementation of the elements and functional entities may vary from that shown in FIG. 8. The connections shown in FIG. 8 are logical connections, and the actual physical connections may be different. The connections can be direct or indirect and there can merely be a functional relationship between components. It is apparent to a person skilled in the art that the apparatus may also comprise other functions and structures.

The apparatus 800 for selecting the extended preambles may comprise a processor 802. The processor 802 may be implemented with a separate digital signal processor provided with suitable software embedded on a computer readable medium, or with a separate logic circuit, such as an application specific integrated circuit (ASIC). The processor 802 may comprise an interface, such as computer port, for providing communication capabilities. The processor 802 may be, for example, a dual-core processor or a multiple-core processor.

The apparatus 800 may comprise a memory 804 connected to the processor 802. However, memory may also be integrated to the processor 802 and, thus, no memory 804 may be required. The memory may be used to store the selected extended preamble (sequences) and to store information needed in determining the timing uncertainty widows and for selecting the extended preambles, such as the ZC root sequence index u, cyclic shift offset $c_{off}$, the number of preambles to generate, such as 64, the length of the preamble sequence $N_G$, such as 839, the cyclic shift separation $N_{CS}$, etc.

The apparatus 800 may further comprise a transceiver (TRX) 806. The TRX 806 may further be connected to one or more antennas 808 enabling connection to and from an air interface. The apparatus 800 may use the TRX 806 to transmit the preamble, to receive the preamble response and to receive the UE specific extended preamble, when the apparatus 800 is a user terminal, to receive the preamble, to transmit the preamble response and to transmit the UE specific extended preamble, when the apparatus 800 is an eNB, for example.

The processor 802 may comprise a preamble generation circuitry 810 for selecting the extended preamble according to the previously mentioned criteria. The processor 802 may comprise a radio control circuitry 812 for performing at least one of the following tasks: radio management, signal reception by correlation at the timing uncertainty windows, propagation delay related processing, radio channel measurements and, power control, etc.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, the apparatus 800 is a user terminal.

In another embodiment, the apparatus is a base station, such as an eNB.

In yet another embodiment, the apparatus 800 is a relay node communicating with the eNB via a backhaul link.

The techniques and methods described herein may be implemented by various means. For example, these techniques may be implemented in hardware (one or more devices), firmware (one or more devices), software (one or more modules), or combinations thereof. For a hardware implementation, the apparatus of FIG. 8 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rear-ranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means for performing any of the tasks related to FIGS. 1 to 7. The processing means may be configured to perform any of the tasks related to FIGS. 1 to 7. The apparatus may comprise also other means for performing any of the tasks related to FIGS. 1 to 7.

Embodiments of the invention may be implemented as computer programs in the apparatus according to the embodiments of the invention. The computer programs comprise instructions for executing a computer process for selecting the extended preambles. The computer program implemented in the apparatus may carry out, but is not limited to, the tasks related to FIGS. 1 to 7.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method, comprising:
    selecting at least one extended preamble from cyclically shifted sequences of a Zadoff-Chu root sequence, wherein the selected at least one extended preamble is to be used in an uplink random access request and each selected extended preamble is the result of a selected cyclic shift which corresponds to cyclic shift -specific timing uncertainty windows, each having a predefined length, wherein:
    the cyclic shift -specific timing uncertainty windows of each extended preamble comprise at least a first window including at least the selected cyclic shift, a second and a third window corresponding to frequency cyclic shifts of +1 or −1 of the first window, respectively, and a fourth and a fifth window corresponding to frequency cyclic shifts of +2 or −2 of the first window, respectively; and
    any of the cyclic shift -specific timing uncertainty windows of the selected extended preamble do not overlap with one other or with any timing uncertainty window of any other preamble using the same Zadoff-Chu root sequence, wherein cell-specific preamble sequences available for use in the uplink random access comprises two separate sets: a first set comprising only at least one non-extended preamble, wherein, in the selection of the at least one non-extended preamble, at least the fourth window and the fifth window are not comprised in the timing uncertainty windows, and a second set comprising only the at least one extended preamble; the method further comprising performing at least one of the following:
    applying different Zadoff-Chu root sequences for the second set and for the non-extended preambles of the first set which are reserved for a contention based random access in order to allow transmitting the random access request carrying a preamble sequence selected from the first set in a same resource unit as the random access request carrying a preamble sequence selected from the second set, and
    transmitting the random access request carrying a preamble sequence selected from the first set in a different resource unit than the random access request carrying a preamble sequence selected from the second set, wherein the resource unit comprises telecommunication transmission resources and wherein the random access request is transmitted using the telecommunication transmission resources.

2. The method of claim 1, wherein the length of each timing uncertainty window equals to a cyclic shift separation between cyclic shifts available for the selection of the extended preamble.

3. The method of claim 2, further comprising:
    testing whether any of the different cyclic shifts available for use in the generation of the extended preamble fulfills the requirements related to the cyclic shift -specific timing uncertainty windows or not; and applying at least one of the cyclic shifts, which fulfill the above requirements, in generation of the selected at least one extended preamble.

4. The method of claim 1, wherein the frequency cyclic shift of +1, −1, +2, or −2 of a selected cyclic shift is given by a cyclic shift offset $+c_{off}$, $-c_{off}$, $+2c_{off}$ or $-2c_{off}$, respectively, where $c_{off}=(N_G m-1)/u$, where $N_G$ is a length of the extended preamble, u is a Zadoff-Chu root sequence index, and m is a smallest positive integer for which $c_{off}$ is an integer.

5. The method of claim 1, further comprising: receiving information informing that at least one extended preamble is to be selected.

6. The method of claim 1, wherein the set of cell-specific preamble sequences available for use in the uplink random access comprise only the selected at least one extended preamble.

7. The method of claim 1, wherein the set of cell-specific preamble sequences available for use in the uplink random access comprise the selected at least one ex-tended preamble and at least one non-extended preamble, wherein, in the selection of the at least one non-extended preamble, at least the fourth window and the fifth window are not comprised in the timing uncertainty windows.

8. The method of claim 1, further comprising: transmitting information of a selected mobile-specific extended preamble to a mobile terminal or to a relay node.

9. An apparatus, comprising:
at least one processor and at least one memory including a computer program code, wherein the at least one memory and the computer pro-gram code are configured to, with the at least one processor, cause the apparatus at least to:
select at least one extended preamble from cyclically shifted sequences of a Zadoff-Chu root sequence, wherein the selected at least one extended preamble is to be used in an uplink random access request and each selected extended preamble is the result of a selected cyclic shift which corresponds to cyclic shift -specific timing uncertainty windows, each having a predefined length, wherein:
the cyclic shift -specific timing uncertainty windows of each extended preamble comprise at least a first window including at least the selected cyclic shift, a second and a third window corresponding to frequency cyclic shifts of +1 or −1 of the first window, respectively, and a fourth and a fifth window corresponding to frequency cyclic shifts of +2 or −2 of the first window, respectively; and
any of the cyclic shift -specific timing uncertainty windows of the selected extended preamble do not overlap with one other or with any timing uncertainty window of any other preamble using the same Zadoff-Chu root sequence, wherein cell-specific preamble sequences available for use in the uplink random access comprises two separate sets: a first set comprising only at least one non-extended preamble, wherein, in the selection of the at least one non-extended preamble, at least the fourth window and the fifth window are not comprised in the timing uncertainty windows, and a second set comprising only the at least one extended preamble, and wherein the apparatus is caused to perform at least one of the following:
apply different Zadoff-Chu root sequences for the second set and for the non-extended preambles of the first set which are reserved for a contention based random access in order to allow transmit the random access request carrying a preamble sequence selected from the first set in a same resource unit as the random access request carrying a preamble sequence selected from the second set, and
transmit the random access request carrying a preamble sequence selected from the first set in a different resource unit than the random access request carrying a preamble sequence selected from the second set, wherein the resource unit comprises telecommunication transmission resources and wherein the random access request is transmitted using the telecommunication transmission resources.

10. The apparatus of claim 9, wherein the length of each timing uncertainty window equals to a cyclic shift separation between cyclic shifts available for the selection of the extended preamble.

11. The apparatus of claim 10, wherein the apparatus is further caused to:
test whether any of the different cyclic shifts available for use in the generation of the extended preamble fulfills the requirements related to the cyclic shift -specific timing uncertainty windows or not;
and apply at least one of the cyclic shifts, which fulfill the above requirements, in generation of the selected at least one extended preamble.

12. The apparatus of claim 9, wherein the frequency cyclic shift of +1, −1, +2, or −2 of a selected cyclic shift is given by a cyclic shift offset $+c_{off}$, $-c_{off}$, $+2c_{off}$, or $-2c_{off}$, respectively, where $c_{off}=(N_G m-1)/u$, where $N_G$ is a length of the extended preamble, u is a Zadoff-Chu root sequence index, and m is a smallest positive integer for which $c_{off}$ is an integer.

13. The apparatus of claim 9, wherein the apparatus is further caused to:
receive information informing that at least one extended preamble is to be selected.

14. The apparatus of claim 9, wherein the set of cell-specific preamble sequences available for use in the uplink random access comprise only the selected at least one extended preamble.

15. The apparatus of claim 9, wherein the set of cell-specific preamble sequences available for use in the uplink random access comprise the selected at least one extended preamble and at least one non-extended preamble, wherein, in the selection of the at least one non-extended preamble, at least the fourth window and the fifth window are not comprised in the timing uncertainty windows.

16. The apparatus of claim 9, wherein the apparatus is further caused to:
transmit information of a selected mobile-specific extended preamble to a mobile terminal or to a relay node.

17. The apparatus of claim 9, wherein the apparatus is comprised in a base station.

18. The apparatus of claim 9, wherein the apparatus is comprised in a user terminal.

19. An apparatus, comprising processing means for performing the method according to claim 1.

20. A computer program product embodied on a non-transitory distribution medium readable by a computer and comprising program instructions which, when loaded into an apparatus, execute the method according to claim 1.

* * * * *